United States Patent Office.

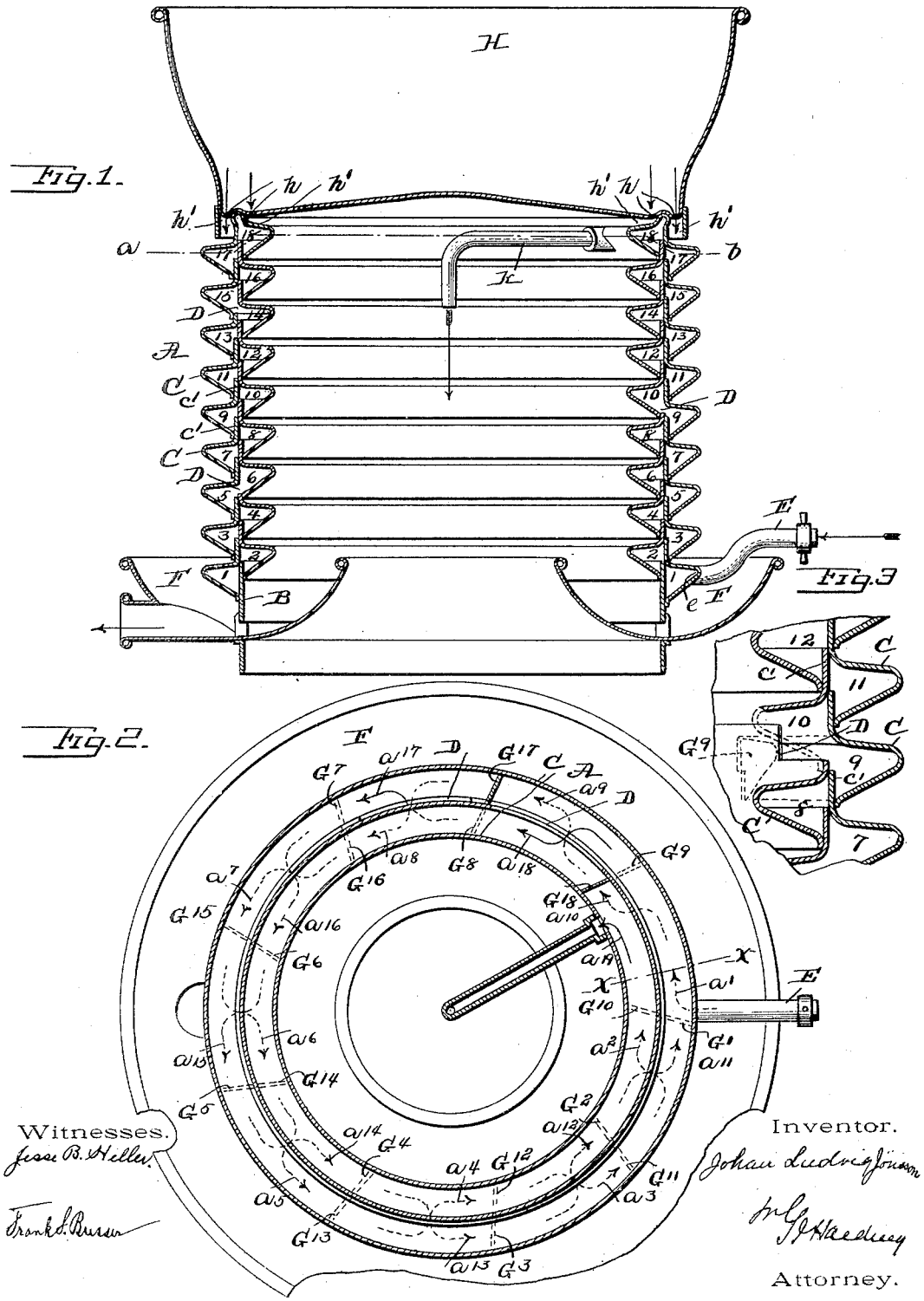

JOHAN LUDVIG JÖNSSON, OF STOCKHOLM, SWEDEN, ASSIGNOR TO THE AKTIEBOLAGET SEPARATOR, OF SAME PLACE.

APPARATUS FOR TREATING MILK, &c.

SPECIFICATION forming part of Letters Patent No. 595,247, dated December 7, 1897.

Application filed December 22, 1896. Serial No. 616,610. (No model.)

*To all whom it may concern:*

Be it known that I, JOHAN LUDVIG JÖNSSON, a subject of the King of Sweden and Norway, residing at Stockholm, Kunzsholmszatan 18, Sweden, have invented certain new and useful Improvements in Apparatus for Cooling or Otherwise Treating Milk and the Like; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to apparatus for cooling or otherwise treating milk and comprises certain improvements hereinafter described whereby an apparatus more durable and more effective may be made than those heretofore in use. Speaking generally, I accomplish this result in the following manner: I form a cylinder having internal and external corrugations, forming two shells, the space between those shells being formed into two sets of passages out of vertical alinement with each other, but each extending around the cylinder and provided with openings from one set of chambers to the other. Hot or cold water passes from one end of this casing to the other, passing through these passages first in the passage of one set, then in the passage of the other, the water thus taking a zigzag or sinuous course from one end to the other. The milk or other liquid to be heated or cooled is fed to the outer surfaces of the interior and exterior corrugations and flows over it from one end to the other in a thin film, always under the action of the heating or cooling medium passing in the interior surfaces of these corrugations. Instead of a cylindrical construction a conical construction may be used.

I will now describe my invention as illustrated in the accompanying drawings and then point out the invention in the claims.

In the drawings, Figure 1 is a vertical central section of my apparatus. Fig. 2 is a horizontal section on the line *a b*, Fig. 1. Fig. 3 is a partial section on line *x x*, Fig. 2.

The cylindrical casing A is formed in the following manner: C are annular U-shaped or V-shaped rings having a flange C'. These rings are secured together, so that in half of said rings the point is toward the interior of the casing and in the other half the point is toward the exterior, what may be called the "inner" and "outer" rings being out of alinement with each other. The flange C' of each ring is connected with the point of the next contiguous inner and outer rings, the bottom inner and outer ring being connected to the annular plate B. There are thus formed between the interior and exterior of the case two series of annular chambers, the chambers of both series being one over the other, but the corresponding chambers of the two series of chambers being out of alinement with each other. Thus, as shown in the drawings, I have eighteen chambers, marked from 1 to 18, the odd-numbered chambers forming one series and the even-numbered chambers the other, the corresponding chambers of the two series, say 1 and 2, being out of vertical alinement with each other—that is, are diagonally arranged—and D are openings between each pair of annular chambers.

$G'$, $G^2$, to $G^{18}$ are diaphragms placed one in each of the chambers just beyond the openings D, so as to deflect the water into the next chamber.

E is the inlet for the water, which communicates through aperture *e* with the annular chamber I and passage around chamber 1, through passage D to chamber 2, around which it passes, thence through passage D to chamber 3, and so on throughout all the chambers to and through chamber 18, (see arrows $a'$ to $a^{19}$,) which is connected to the pipe *k*, through which the water is discharged.

F is a trough-shaped receiver or pan in which the plate B rests.

H is the vessel containing the milk or other liquid to be treated. This vessel has perforations *h* to the annular trough *h'* in line with the exterior of the exterior and interior corrugations and spreads itself in thin films over these surfaces until it falls into the receiver or pan F, during which passage of the milk it is subjected to the action of the liquid passing through the chambers 1 to 18.

An apparatus constructed as above described can be made considerably smaller than one of the same capacity as hitherto constructed, and, furthermore, accession of strength is insured by the combination of the corrugated rings, soldered or otherwise secured to each other, as shown. There is, besides, no necessity for the corrugations being formed as deep as would otherwise be necessary, and the said corrugations are consequently far stronger and less liable to be bulged or deformed by rough usage.

It is evident that the above-described apparatus might be advantageously used for heating milk or other fluids by simply passing hot water, steam, or other heating medium through the annular chambers instead of the cooling-water.

I do not intend to limit myself to the specific construction hereinbefore described, except wherein the same may be specifically described, as the construction may be varied, such as making the casing conical in shape or in the shape of a frustum of a cone.

Having now fully described my invention, what I claim, and desire to protect by Letters Patent, is—

1. An apparatus for cooling or otherwise treating milk and the like, comprising a casing having an internal and an external corrugated shell, the space between the shells being formed into annular chambers in pairs, one in the external shell and the other in the internal and passages connecting the chambers, one shell being arranged in position obliquely with reference to the chambers in the other shell.

2. An apparatus for cooling or otherwise treating milk and the like, having a casing formed of two corrugated shells, the corrugations of one shell being out of alinement with the corrugations in the other shell, annular chambers formed in each shell and connections between the annular chambers of one shell and those of the other, an inlet to one of the chambers and an outlet from another chamber.

3. An apparatus for cooling or otherwise treating milk and the like, consisting of an inner series of corrugated rings one above the other, and an outer series of corrugated rings one above the other, the two series of rings being out of alinement with each other, the two series being secured together, there being openings or passages between corresponding rings.

In testimony whereof I affix my signature in presence of two witnesses.

JOHAN LUDVIG JÖNSSON.

Witnesses:
CARL P. GERELL,
TH. WAWRINSKY.